(12) United States Patent
Lee et al.

(10) Patent No.: US 10,157,589 B2
(45) Date of Patent: Dec. 18, 2018

(54) DISPLAY APPARATUS AND METHOD OF CONTROLLING THE SAME

(71) Applicant: SAMSUNG ELECTRONICS CO., LTD., Suwon-si (KR)

(72) Inventors: Woong-Ki Lee, Yongin-si (KR); Sung Hwan Jang, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 65 days.

(21) Appl. No.: 15/269,219

(22) Filed: Sep. 19, 2016

(65) Prior Publication Data

US 2017/0109899 A1 Apr. 20, 2017

(30) Foreign Application Priority Data

Oct. 19, 2015 (KR) .................. 10-2015-0145167

(51) Int. Cl.
*G09G 5/02* (2006.01)
*H04N 1/60* (2006.01)
*H04N 1/62* (2006.01)

(52) U.S. Cl.
CPC .............. *G09G 5/02* (2013.01); *H04N 1/60* (2013.01); *H04N 1/6027* (2013.01); *H04N 1/628* (2013.01)

(58) Field of Classification Search
CPC combination set(s) only.
See application file for complete search history.

(56) References Cited

U.S. PATENT DOCUMENTS 8,254,673 B2 * 8/2012 Kwak .................. H04N 1/6058
    382/162
8,660,346 B2 * 2/2014 Itoh .......................... G06T 7/13
    382/163
9,721,532 B2 * 8/2017 Minagawa ............... G09G 5/06

FOREIGN PATENT DOCUMENTS

KR     10-2007-0062099 A     6/2007

* cited by examiner

*Primary Examiner* — Wesner Sajous
(74) *Attorney, Agent, or Firm* — Sughrue Mion, PLLC

(57) ABSTRACT

A display apparatus includes a color selector configured to select a preferred color corresponding to at least one among a main target and a sub-target determined in an image based on color distribution; a color converter configured to perform color conversion by setting a degree of color conversion of at least one among the main target and the sub-target and converting a color of the at least one among the main target and the sub-target in the image based on the set degree of color conversion; and a controller configured to display the color-converted image via a display panel.

18 Claims, 15 Drawing Sheets
(6 of 15 Drawing Sheet(s) Filed in Color)

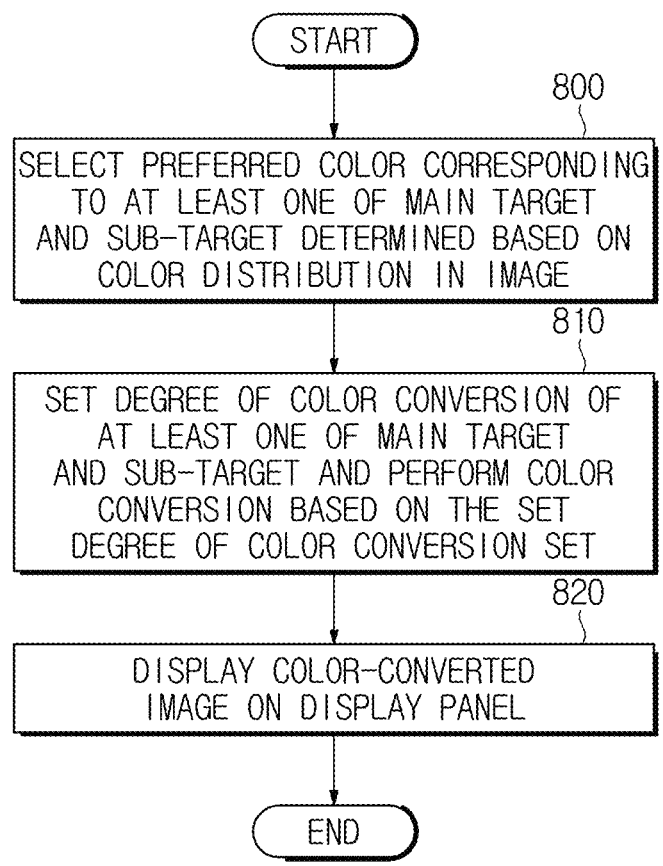

DISPLAY APPARATUS AND METHOD OF CONTROLLING THE SAME

CROSS-REFERENCE TO RELATED APPLICATION(S)

This application claims priority from Korean Patent Application No. 10-2015-0145167, filed on Oct. 19, 2015, in the Korean Intellectual Property Office, the disclosure of which is incorporated herein by reference in its entirety.

BACKGROUND

1. Field

Apparatuses and methods consistent with exemplary embodiments relate to display apparatuses providing a user with various images and methods of controlling the same.

2. Description of the Related Art

Display apparatuses are devices that visually display various images. The images displayed via these display apparatuses may be images received via broadcasting signals and/or images received from a web server.

Display apparatuses provide users with high quality viewing services with immersive images by converting received images into more immersive images. Thus, research has been conducted into developing methods of providing immersive images by converting images.

SUMMARY

According to an aspect of an exemplary embodiment, there is provided a display apparatus including: a color selector configured to select a preferred color corresponding to at least one among a main target and a sub-target determined in an image based on color distribution; a color converter configured to perform color conversion by setting a degree of color conversion of at least one among the main target and the sub-target and converting a color of the at least one among the main target and the sub-target in the image based on the set degree of color conversion; and a controller configured to display the image via a display panel.

The color selector may be further configured to determine at least one among the main target and the sub-target by analyzing color distribution of a main viewing area in the image.

The color selector may be further configured to determine at least one among the main target and the sub-target based on at least one among a distribution amount and a distribution degree of colors in a main viewing area of the image.

The color selector may be further configured to analyze distribution amounts and distribution degrees of colors in a main viewing area of the image, set priorities to the analyzed distribution amounts and distribution degrees of colors, and determine the main target and the sub-target based on the set priorities.

The color selector may be further configured to set a preferred color for the main target as a main color and a preferred color for the sub-target as a sub-color in a color space.

The color selector may be further configured to analyze color distribution of an entire viewing area and determine at least one among the main target and the sub-target in response to determining that there is no main target in the main viewing area.

The color selector may be further configured to determine at least one among the main target and the sub-target by analyzing color distribution of the image whenever a scene is changed in the image.

The color selector may be further configured to set a circular area having a diameter equal to a length of the display panel to display the image as a main viewing area.

The color converter may be further configured to set different degrees of color conversion for the main target and the sub-target.

The color converter may be further configured to perform color conversion based on preset color conversion rates for the main target and the sub-target.

The color converter may be further configured to perform color conversion to have a distance between a color of the main target and a preferred color for the main target shorter than a distance between a color of the sub-target and a preferred color for the sub-target in a color space.

The color converter may be further configured to perform color conversion to have a distance between a color of the main target and the main color shorter than a distance between a color of the sub-target and the sub-color in the color space.

The color converter may be further configured to maintain degrees of color conversion for the main target and the sub-target until a scene is changed in the image.

According to an aspect of another exemplary embodiment, there is provided a method of controlling a display apparatus, the method including: selecting a preferred color corresponding to at least one among a main target and a sub-target determined in an image based on color distribution; performing color conversion by setting a degree of color conversion of at least one among the main target and the sub-target and converting a color of the at least one among the main target and the sub-target in the image based on the set degree of color conversion; and displaying the image via a display panel.

The selecting the preferred color may include determining at least one among the main target and the sub-target by analyzing color distribution of a main viewing area in the image.

The selecting the preferred color may include determining at least one among the main target and the sub-target based on at least one among a distribution amount and a distribution degree of colors in a main viewing area of the image.

The selecting the preferred color may include analyzing distribution amounts and distribution degrees of colors in a main viewing area of the image, setting priorities to the analyzed distribution amounts and distribution degrees of colors, and determining the main target and the sub-target based on the set priorities.

The selecting the preferred color may include analyzing color distribution of the entire viewing area and determining at least one among the main target and the sub-target upon determination that there is no main target in the main viewing area.

The selecting the preferred color may include determining at least one among the main target and the sub-target by analyzing color distribution of the image whenever a scene is changed in the image.

The performing the color conversion may include setting different degrees of color conversion for the main target and the sub-target.

BRIEF DESCRIPTION OF THE DRAWINGS

The patent or application file contains at least one drawing executed in color. Copies of this patent or patent application publication with color drawings will be provided by the Office upon request and payment of the necessary fee.

These and/or other aspects of the disclosure will become apparent and more readily appreciated from the following description of the exemplary embodiments, taken in conjunction with the accompanying drawings of which:

FIG. 8 is a flowchart for describing operation of a display apparatus displaying an image in which color conversion is performed on at least one of the main target and the sub-target on a display panel, according to an exemplary embodiment.

DETAILED DESCRIPTION OF EXEMPLARY EMBODIMENTS

Figure 1:
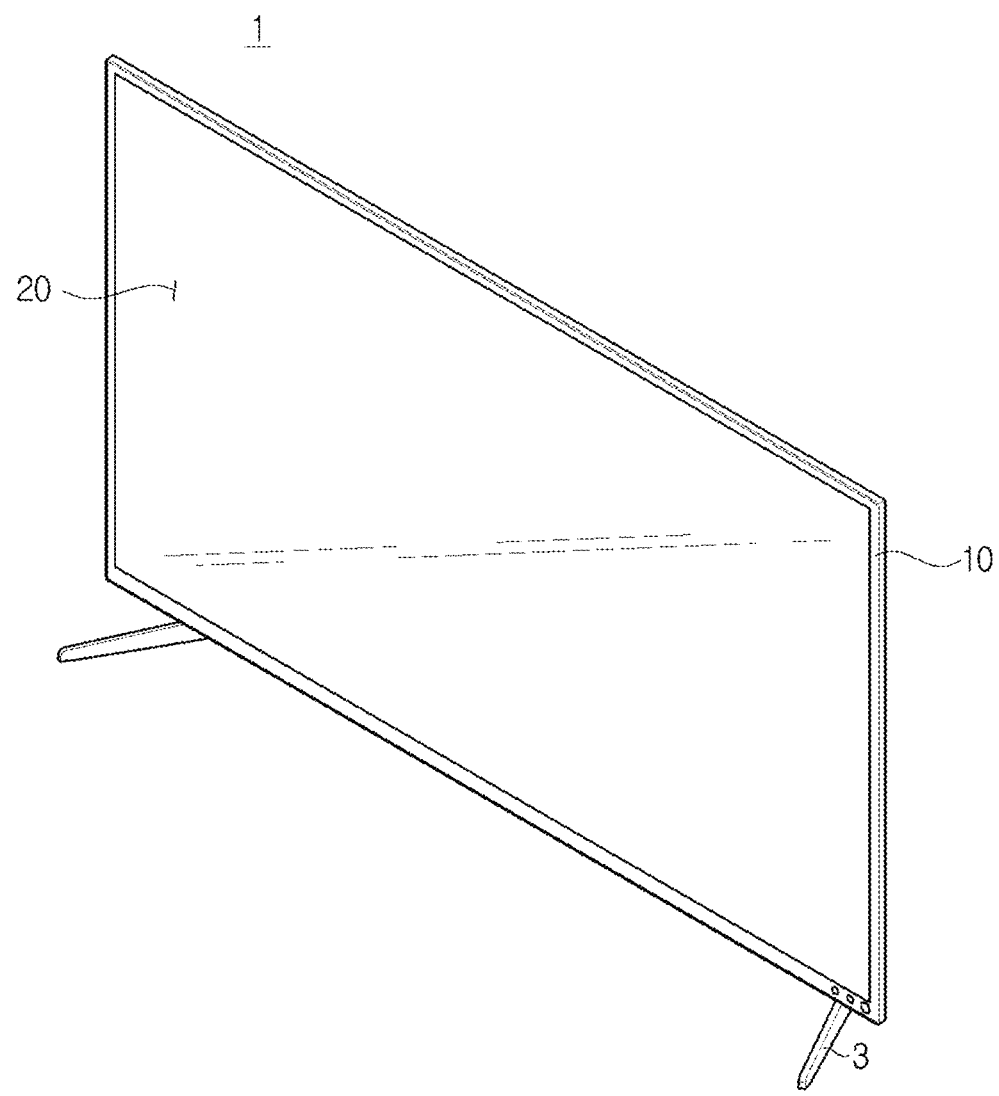
FIG. 1 is a view illustrating an appearance of a display apparatus according to an exemplary embodiment.

Reference will now be made in detail to the exemplary embodiments, examples of which are illustrated in the accompanying drawings, wherein like reference numerals refer to like elements throughout.

Figure 2:
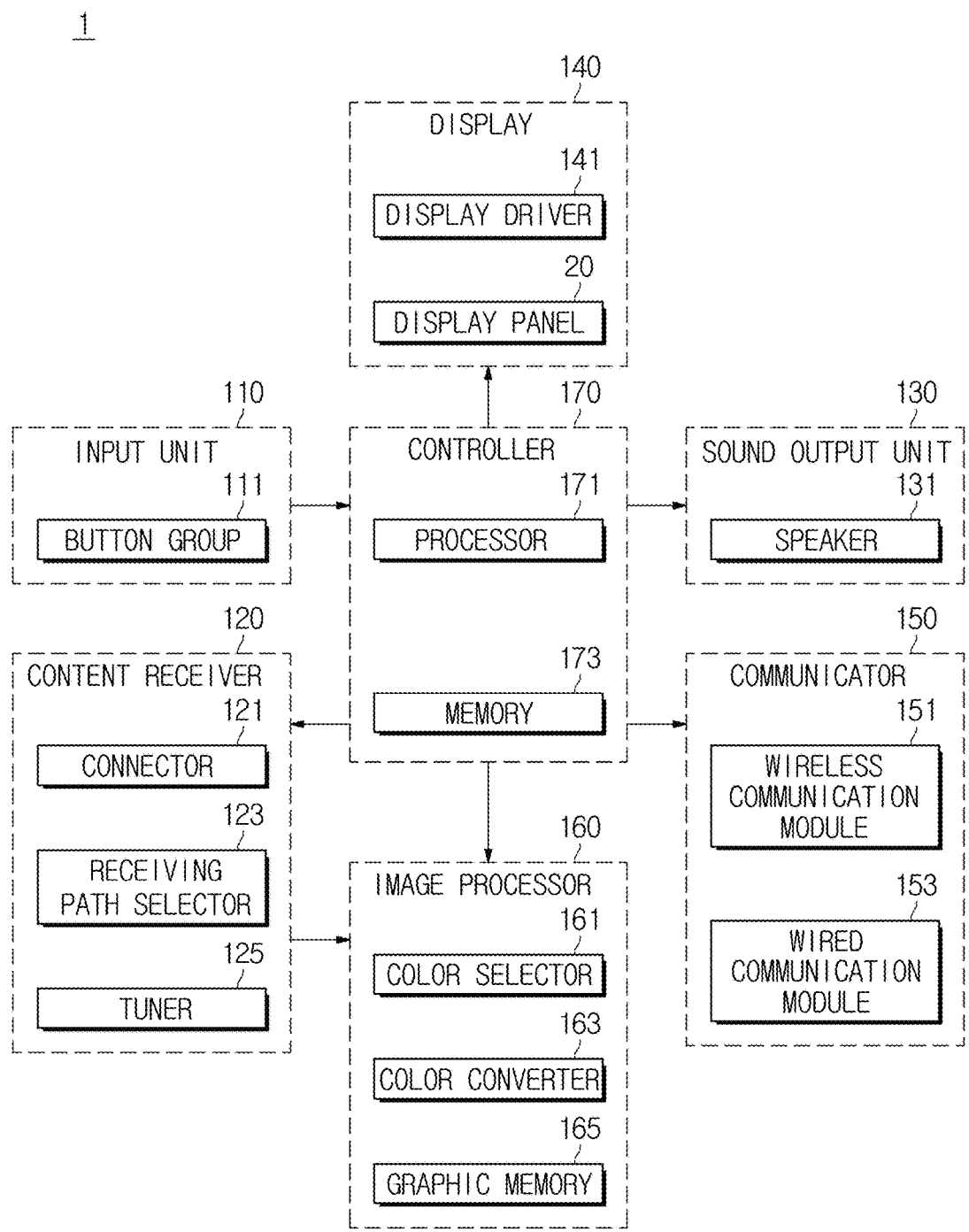
FIG. 2 is a control block diagram illustrating a display apparatus according to an exemplary embodiment.
Figure 3A:
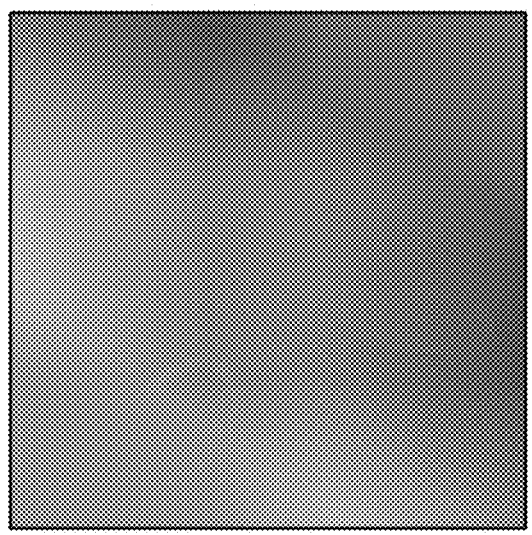
FIG. 3A, FIG. 3B, and FIG. 3C are views illustrating color spaces and color regions defined in the color spaces according to objects.
Figure 3B:
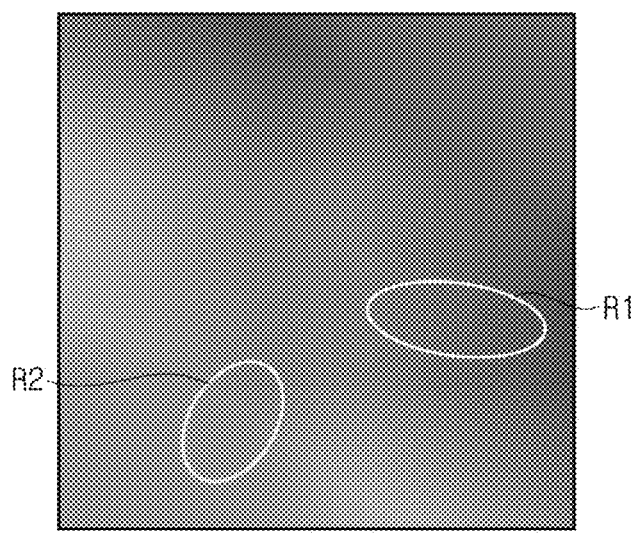
Figure 3C:
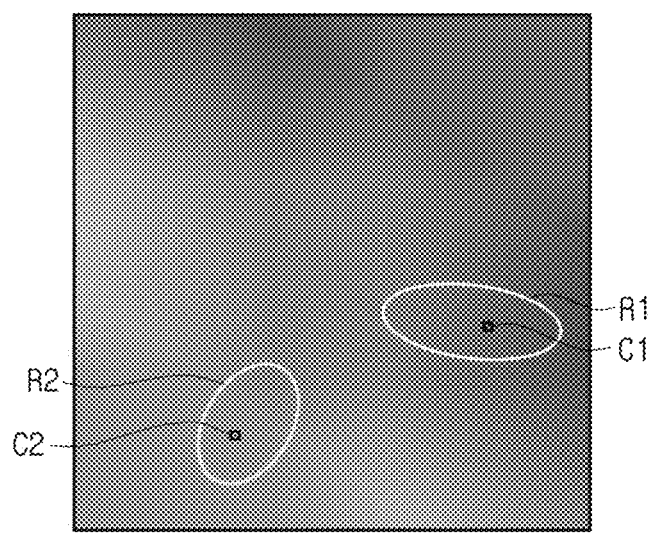
Figure 4A:
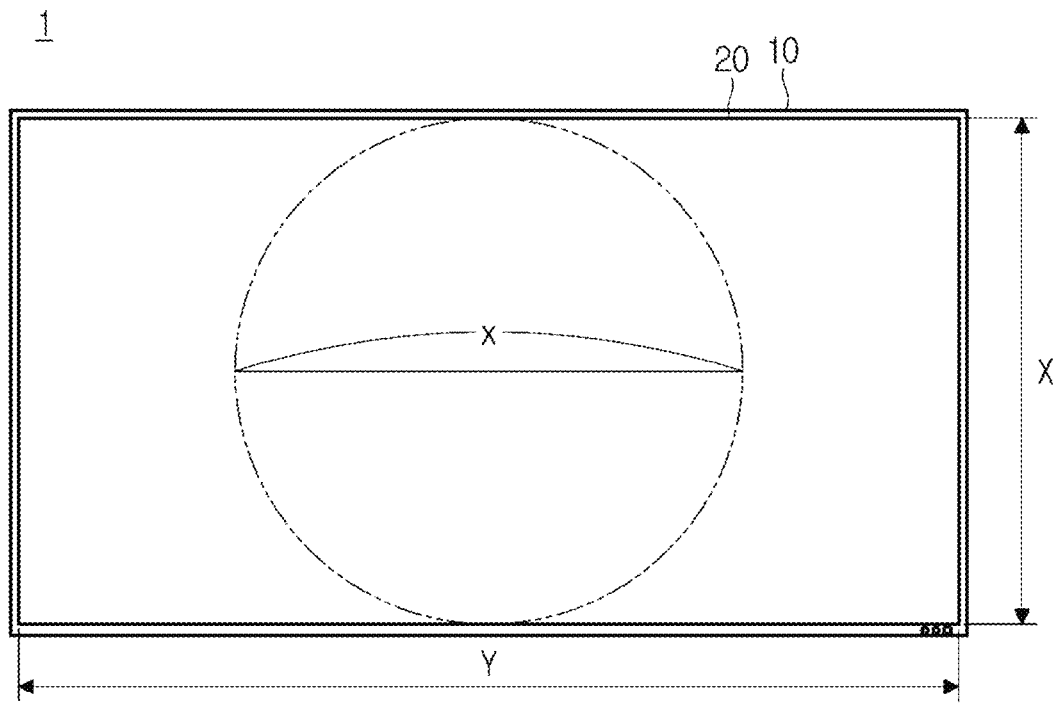
FIG. 4A, FIG. 4B, and FIG. 4C are views illustrating main viewing areas on a display panel according to an exemplary embodiment.
Figure 4B:
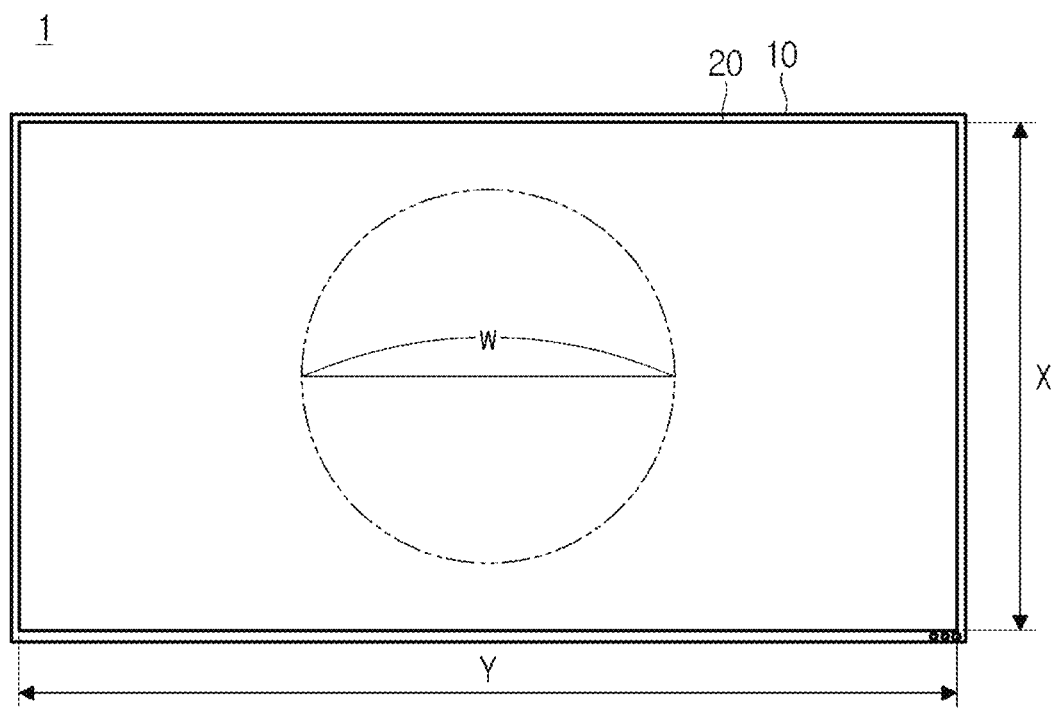
Figure 4C:
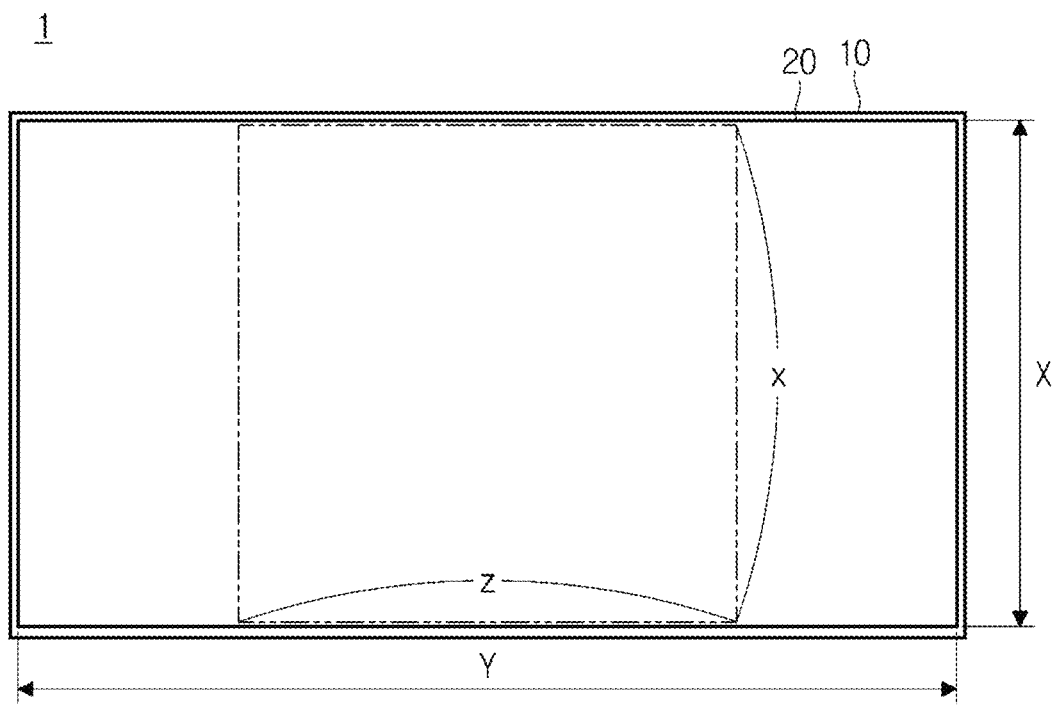
Figure 5A:
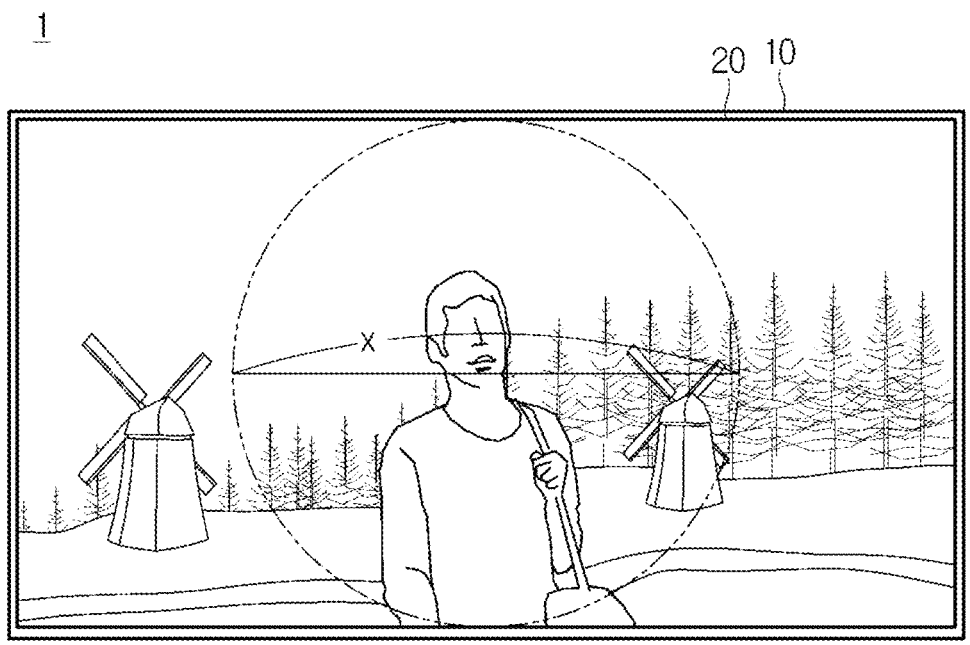
FIGS. 5A and 5B are views illustrating methods of determining a main target in a main viewing area according to an exemplary embodiment.
Figure 5B:
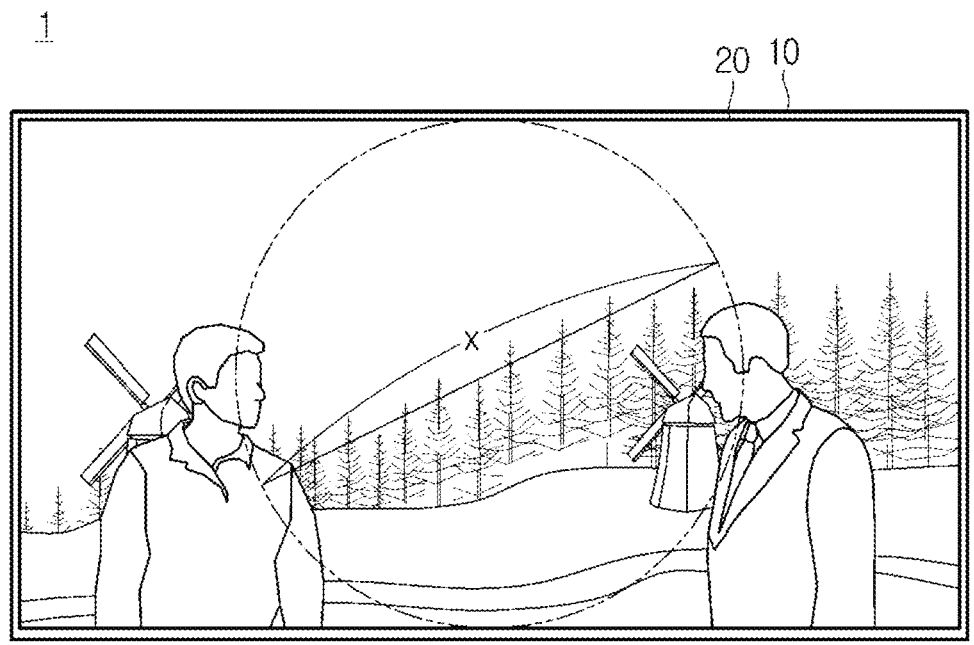

FIG. 1 is a view illustrating an appearance of a display apparatus according to an exemplary embodiment. FIG. 2 is a control block diagram illustrating a display apparatus according to an exemplary embodiment. FIGS. 3A to 3C are views for describing color spaces and color regions defined in the color spaces according to objects. FIGS. 4A to 4C are views for describing main viewing areas on a display panel according to an exemplary embodiment. FIGS. 5A and 5B are views for describing methods of determining a main target in a main viewing area according to an exemplary embodiment. Hereinafter, the drawings will be synthetically described to avoid repeated descriptions.

Throughout the specification, the display apparatus refers to an apparatus visually displaying image data in various formats by using a display panel that displays images. Examples of the display apparatus include televisions, monitors, and portable multimedia devices such as personal digital assistants (PDPs) and portable multimedia players (PMPs). Besides, the display apparatus may also include all devices implemented in various forms such as mobile communication terminals such as smartphones or wearable devices implemented using glasses and watches.

Hereinafter, a display apparatus illustrated in FIG. 1 will be described as an example of the display apparatus according to an exemplary embodiment. However, the following exemplary embodiments are not limited thereto and any device including a display panel and visually providing a user with various images may also be applied to the following exemplary embodiments without limitation.

Referring to FIG. 1, a display apparatus 1 includes a main body 10 constituting an external appearance of the display apparatus 1 and accommodating various parts of the display apparatus 1, a display panel 20 configured to display a user with an image.

Meanwhile, the display apparatus 1 of FIG. 1 may be implemented using a table-mounted type or a wall mounted type according to methods of supporting the display apparatus. According to an exemplary embodiment, the main body 10 may be implemented using a wall mounted type installed on a vertical surface such as a wall by using a bracket, and the like. According to another exemplary embodiment, a stand to support the main body 10 may be provided at a lower portion of the main body 10. The main body 10 may be stably disposed on a plane by the stand 3.

A front surface of the main body 10 may be provided with a button group to receive various control commands from the user and the display panel 20 to display an image in accordance with the control commands from the user.

Also, various parts to realize functions of the display apparatus 1 may be provided in the main body 10. Hereinafter, a control block diagram of the display apparatus 1 will be described.

Referring to FIG. 2, the display apparatus 1 includes an input unit 110 configured to receive various control commands from the user, a content receiver 120 configured to receive contents including images and sounds from an external device, a sound output unit 130 configured to output sounds corresponding to sound data included in the contents, a display configured to display images corresponding to image data included in the contents, a communicator 150 configured to transmit and receive various data such as the contents via communication networks, an image processor 160 configured to process image data included in the contents, and a controller 170 configured to control the overall operation of the display apparatus 1.

Here, at least one of the content receiver 120, the communicator 150, the image processor 160, and the controller 170 may be integrated into a system on chip (SOC) embedded in the display apparatus 1. However, there may not be only one SOC embedded in the display apparatus 1, and exemplary embodiments are not limited to the case of being integrated into one SOC.

The input unit 110 may receive various control commands from the user.

For example, the input unit 110 may include a button group 111 as illustrated in FIG. 2. According to an exemplary embodiment, the button group 111 may include a volume button configured to control a volume of sounds output from the sound output unit 130, a channel button configured to change communication channels to receive contents via the content receiver 120, and a power button configured to turn on/off power of the display apparatus 1. Besides, the input unit 110 may receive various control commands regarding the display apparatus 1 from the user via the button group 111 without limitation.

Meanwhile, various buttons included in the button group 111 may include a push switch or membrane switch configured to sense pressure applied by the user and a touch switch configured to sense a contact of a body part of the user. However, exemplary embodiments are not limited thereto, and the button group 111 may include various input devices to output electric signals corresponding to a given motion of the user.

In addition, the input unit 110 may include a remote controller configured to receive a control command from the user and remotely transmit the received user control command to the display apparatus 1. In addition, the input unit 110 may include various known elements to receive the control command from the user without limitation. In addition, if the display panel 20 is implemented using a touch-screen type display panel, the display panel 20 may perform functions of the input unit 110 as well.

For example, the input unit 110 may receive a control command regarding the display apparatus 1 from the user via the button group 111, the remote controller, the touch-screen display, or the like as described above. Accordingly, the input unit 110 may transmit the received control command to the controller 170, and the controller 170 may control at least one of the elements of the display apparatus 1, which will be described later.

The content receiver 120 may receive various contents from various external devices. For example, the content receiver 120 may receive contents from an antenna configured to receive broadcast signals via a wireless communication network, a set top box configured to receive broadcast signals received via a wired or wireless communication network and appropriately convent the received broadcast signals, and a multimedia reproduction device configured to reproduce contents stored in a multimedia storage medium, such as a DVD player, a CD player, and a Blu-ray disc player.

Particularly, the content receiver 120 may include a plurality of connectors 121 connected to external devices, a receiving path selector 123 configured to select a path through which contents are received from the plurality of connectors 121, and a tuner 125 configured to select a channel (or frequency) to receive the broadcast signals while receiving the broadcast signals.

The connector 121 may include a RF coaxial cable connector configured to receive broadcast signals including contents from the antenna, a high definition multimedia interface (HDMI) connector, a component video connector, a composite video connector, and a D-sub connector to receive contents from the set top box or the multimedia reproduction device.

The receiving path selector 123 selects one connector to receive contents from the plurality of connectors described above. For example, the receiving path selector 123 may automatically select a connector 121 through which the contents have been received or manually select a connector 121 to receive the contents in accordance with a control command of the user.

In case of receiving broadcast signals, the tuner 125 extracts signals of a predetermined frequency (channel) from various signals received via the antenna, or the like. In other words, the tuner 125 may select a channel (or frequency) to receive the contents in accordance with a user's command to select the channel.

When an image of the channel selected by the tuner 125 is received, the image processor 160 may provide an immersive image by determining at least one of a main target and a sub-target, which are targets for color conversion, and performing color conversion therefor. This will be described later.

The display apparatus 1 may also include a sound output unit 130.

The sound output unit 130 may output sounds upon receiving sound data from the content receiver 120 in accordance with a control signal of the controller 170. In this case, the sound output unit 130 may include one or at least two speakers 131 configured to convert electric signals into sound signals.

Meanwhile, the display apparatus 1 may include the display 140. Referring to FIG. 2, the display 140 may include a display driver 141 and the display panel 20.

Here, the display panel 20 may be implemented using a cathode ray tube (CRT) display panel, a liquid crystal display (LCD) panel, a light emitting diode (LED) panel, an organic light emitting diode (OLED) panel, a plasma display panel (PDP), a field emission display (FED) panel, and the like, without limitation. However, the display panel 20 is not limited thereto, and any known display devices to visually display images may also be used.

The display driver 141 may drive the display panel 20 to receive image data from the image processor 160 in accordance with the control signal of the controller 170 and display an image corresponding to the received data. The controller 170 will be described later in more detail.

Meanwhile, the display apparatus 1 may include the communicator 150 as illustrated in FIG. 2. The communicator 150 may include a wireless communication module 151 supporting wireless communication protocols and a wired communication module 153 supporting wired communication protocols and may support various communication protocols.

Communication protocols are classified into wireless and wired communication protocols. Here, the wireless communication protocols refer to communication protocols to wirelessly transmit and receive signals including data. In this case, the wireless communication protocols may include various communication networks such as 3G, 4G, Wireless LAN, Wi-Fi, Bluetooth, Zigbee, Wi-Fi Direct (WFD), Ultra Wideband (UWB), Infrared Data Association (IrDA), Bluetooth Low Energy (BLE), Near Field Communication (NFC), and Z-Wave, without being limited thereto.

In addition, the wired communication protocols refer to communication protocols to transmit and receive signals including data by wire. For example, the wired communication protocols include Peripheral Component Interconnect (PCI), PCI-express, and Universe Serial Bus (USB), without being limited thereto.

For example, the communicator 150 may transmit and receive various data such as images to and from an Internet of things (IoT) device via a base station by communication protocols such as 3G or 4G. Also, the communicator 150 may transmit and receive data within a predetermined distance by various wireless communication protocols such as Wireless LAN, Wi-Fi, Bluetooth, Z-wave, Zigbee, WFD, UWB, IrDA, BLE, and NFC.

Meanwhile, the wired communication module 151 and the wireless communication module 153 may be implemented using single chips, respectively. However, exemplary embodiments are not limited thereto, and the wired communication module 151 and the wireless communication module 153 may also be integrated into a single chip, without limitation.

Meanwhile, referring to FIG. 2, the display apparatus 1 may include the image processor 160. The image processor 160 may perform image processing on image data among contents received from the communicator 150 or the content receiver 120.

In this case, the image processor 160 may include a color selector 161, a color converter 163, and a graphic memory 165 as illustrated in FIG. 2. Here, the color selector 161 and the color converter 163 may be implemented using graphic processor configured to perform image processing on image data in accordance with an image processing program stored in the graphic memory 165. Meanwhile, the color selector 161 and the color converter 163 may be implemented using single chips, respectively, or integrated into a single chip.

The color selector 161 analyzes color distribution of an image to determine a target for color conversion and select a preferred color used to display the determined target. For example, the color selector 161 may analyze color distribution of image data received via the content receiver 120 or the communicator 150. Here, the color distribution refers to amounts of distributed colors, positions of the distributed colors, distribution degrees of the colors indicating densities of similar colors in an image, and the like.

For example, the color selector 161 may find out colors distributed in the image, amounts of the respective colors, positions of the respective colors, densities of similar colors, densities of colors included in the same color region, and the like by analyzing color distribution of the image. According to an exemplary embodiment, the color selector 161 may analyze colors distributed in the image, colors densely distributed in the image, position of the densely distributed colors, and the like by analyzing color coordinates of each of the pixels constituting the image.

For example, each color used in an image may be defined by coordinates and arranged in a color space. Here, the color space indicates a range of representable colors. In other words, the color space refers to a range of reproducible colors. For example, the color space refers to a space or area in which coordinates are respectively mapped to all colors perceived by human vision.

The color space may be may be expressed by using various methods. For example, the color space may be expressed by a Red Green Blue (RGB) color model, a YCbCr (YUV) color model represented by differences in brightness and color, or the like. Hereinafter, the YUV color space will be described as an example. However, exemplary embodiments are not limited thereto, and any device including a graphic process and performing color conversion may also be applied to the following exemplary embodiments.

In the color space, colors are arranged on a pixel basis, and coordinates are set to each pixel to represent the arranged colors. Here, the coordinates are referred to as color coordinates. Since all colors represented in the image are included in the color space, arranged on a pixel basis, and defined by color coordinates respectively corresponding thereto, the controller 170 may visually provide the user with an image by displaying colors corresponding to the color space on the display panel 20. The controller 170 will be described in more detail later.

According to an exemplary embodiment, FIG. 3A is an YUV color space. In this case, the color space may include color regions. The color regions may vary according to objects and include colors used to represent the objects.

Here, the object may include all visually representable portions, such as human skin, sea, grass, or the like in addition to human. Or, the object may include all colors of the visually representable portions, such as human skin color, sea color, grass color, or the like.

In this case, the objects included in the image may be classified in various manners. According to an exemplary embodiment, the objects may be classified into a main target, a sub-target, an uninterested target, and the like. The main target, the sub-target, and the uninterested target may be determined based on the analysis results of color distribution.

In this regard, the main target may be an object of the image at which the user mainly gazes. In addition, the sub-target may be an object at which the user gazes less than the main target but subject to color conversion. In addition, the uninterested target may be an object of the image not subject to color conversion. Here, color conversion is not performed on the uninterested target. Although a color region of the uninterested target is set in the color space, the uninterested target may be an object that is not color-converted according to the analysis results, or an object, the color region of which is not set in the color space.

For example, a color region of grass or grass color may include colors generally used to represent grass, e.g., a series of green colors. In addition, a color region of sea or sea color may include colors generally used to represent sea, e.g., a series of blue colors.

If colors included in a color region of a given object are distributed in an amount more than a predetermined amount in the image or distributed more densely than a predetermined level, the color selector 161 may determine the given object as a main target or a sub-target for color conversion.

In this case, there may be colors preferred by the user for the objects, respectively. Here, the preferred color is a color preferred by the user. For example, there may be a user's preferred color as grass color. Also, there may be a user's preferred color as sea color.

That is, the color region is set on the object basis as described above and includes colors used to represent the object. In addition, the preferred color may vary according to the object. Since the preferred color is used to represent the object, the color region of the object may include the preferred color, and corresponding color coordinates may be mapped onto the preferred color. In other words, the color region may be set in the color space on the object basis and may include colors preferred by the user to represent the object.

The display apparatus 1 according to an exemplary embodiment improve immersive feeling of the user by providing an image in which color conversion is performed such that the main target, at which the user mainly gazes, is represented using a preferred color or a color similar to the preferred color. To this end, the color selector 161 may determine a target for color conversion, i.e., the main target and the sub-target subject for color conversion and select preferred colors respectively for the color region of the main target and the color region of the sub-target.

For example, referring to FIG. 3B, a first region R1 indicates a color region about the sea color. In addition, a second region R2 indicates a color region about the grass color. If colors included in the first region R1 are densely distributed in the image, the color selector 161 may determine the object as sea, particularly, the sea color representing the sea.

Then, the color converter 163 may convert colors representing the object into colors preferred by the user, i.e., preferred colors, or similar colors thereto, which will be described later. Accordingly, the display apparatus 1 according to an exemplary embodiment converts the color of the object at which the user mainly gazes into the preferred color or a similar color thereto, and thus the object may be more efficiently recognized by the user and the user may have more immersive feeling.

FIG. 3C is an YUV color space illustrating a position of a preferred color in a color region according to an exemplary embodiment. Referring to FIG. 3C, the first region R1 indicates a color region of the sea color, and the second region R2 indicates a color region of the grass color.

For example, the color selector 161 may determine the sea or sea color as the main target and grass or grass color as the sub-target as a result of analysis of color distribution. Accordingly, the color selector 161 may select a preferred color C1 for the first region R1 as a preferred color for the main target and select a preferred color C2 for the second region R2 as a preferred color for the sub-target. In this case, the preferred color for the main target is referred to as a main color, and the preferred color for the sub-target is referred to as a sub-color.

In this case, the color selector 161 may determine at least one of the main target and the sub-target based on color distribution of the image. For example, the color selector 161 may determine at least one of the main target and the sub-target by analyzing color distribution of the main viewing area in the image.

Here, the main viewing area may be preset as an area at which the user mainly gazes. The main viewing area may be set in various forms in the image.

For example, the main viewing area may be set as a circle as illustrated in FIG. 4A. Here, X indicates a length of the display panel 20, and Y indicates a width of the display panel 20. Here, Y and X may be implemented at a ratio of 16:9, without being limited thereto. Referring to FIG. 4A, the main viewing area may be set using a center of the display panel 20 as a center of the circle and the length X as a diameter of the circle.

That is, since the color selector 161 analyzes color distribution of only a given region, color distribution of unnecessary regions may not be performed. Thus, color distribution may be analyzed in real time by reducing computation loads.

Meanwhile, the main viewing area is not limited to that illustrated in FIG. 4A. For example, the main viewing area may also be set as a circle using the center of the display panel 20 as a center of the circle and using a diameter W smaller than the length X as illustrated in FIG. 4B.

Also, the main viewing area may be set as a quadrangle using the length X and a width Z as illustrated in FIG. 4C. Here, Z<Y. Thus, the main viewing area may be a square when Z is the same as X and may be a rectangle when Z is different from X.

Besides, the main viewing area may be set as various polygons, without limitation. Data about the main viewing area may be stored in the graphic memory 165. Thus, the color selector 161 may set the main viewing area by using data stored in the graphic memory 165 and determine at least one of the main target and the sub-target in the set main viewing area.

However, there may not be a main target in the main viewing area. For example, there may be no color region satisfying a predetermined distribution amount or greater or a predetermined distribution degree or greater in the main viewing area. Thus, the color selector 161 may determine at least one of the main target and the sub-target based on at least one of the distribution amount and the distribution degree of colors in the entire viewing area.

For example, the color selector 161 may analyze distribution amounts of respective colors of the entire viewing area of the image to determine one object located in one color region including a color having the largest distribution amount as a main target, and determine another object located in another color region including a color having a second largest distribution amount as a sub-target. That is, the objects may be determined as the main target and the sub-target in descending order by distribution amounts of the colors included in the color regions from the largest distribution amount by analyzing the distribution amounts of the colors included in the image.

In addition, the color selector 161 may determine at least one of the main target and the sub-target according to distribution degrees of colors. In this regard the distribution degree refers to a degree of distribution density of a color included in the same color region. That is, the color selector 161 determines the degree of distribution density, if there are dense colors, the color selector 161 determine the colors as the main target and the sub-target in accordance with the density thereof.

Meanwhile, during the analysis of the color distribution, the color selector 161 may perform the analysis in accordance with priorities. For example, even when there is one object related to one color having the larger distribution amount, the color selector 161 may determine another object related to another color having a predetermined distribution degree or greater as the main target. Methods of determining at least one of the main target and the sub-target by analyzing color distribution are not limited to the examples described above. Meanwhile, methods of analyzing color distribution may be implemented using programs or algorithms and stored in the graphic memory 165.

For example, a main viewing area having a circular shape and a diameter of X is illustrated in FIG. 5A. Here, the main viewing area includes a human skin. Accordingly, the color selector 161 may determine the human skin, a color region of which is set, and having a high distribution degree in the main viewing area, as the main target and select a preferred color used to represent the human skin.

Meanwhile, as illustrated in FIG. 5B, the main viewing area of the image may not include skins of two people at which the user gazes. When the main viewing area does not include a main target satisfying predetermined conditions, the color selector 161 may analyze color distribution of a larger area than the main viewing area and determine at least one of the main target and the sub-target.

For example, the color selector 161 may determine a human skin having the highest distribution density as the main target by analyzing color distribution of the entire viewing area of FIG. 5b. Thus, the color selector 161 may select a preferred color for the main target, i.e., preferred color for the human skin. The color converter 163 may perform color conversion such that the skin colors of the two people become the same as or similar to the selected preferred color, which will be described later.

Meanwhile, the preferred color for the human skin may vary according to races. For example, white people prefer a reddish skin color, and black people prefer a white skin color. That is, the preferred colors for the human skin may be differently set according to races. Thus, the human skin may have different color regions depending on races and preferred colors may vary.

Meanwhile, whenever a scene is changed in the image, the color selector 161 may determine at least one of the main target and the sub-target and select preferred colors respectively for the determined main target and sub-target. In other words, the color selector 161 may maintain the determined main target and the sub-target until the scene is changed in the image.

Changing the main target and the sub-target before the scene is changed may indicate changing targets for color conversion. Thus, the user may be inconvenient while watching the image. Accordingly, the color selector 161 may maintain the selected preferred color by maintaining the targets for color conversion while the scene is maintained.

Meanwhile, the main target and the sub-target may be one or plural in number. The numbers of the main target and the sub-target are not particularly limited. Data about the numbers of the main target and the sub-target may be preset and stored in the graphic memory 165.

When the color selector 161 determines targets for color conversion by analyzing color distribution and selects preferred colors for the determined targets, the color converter 163 provides an optimized image by performing color conversion, which will be described later.

Meanwhile, the analysis of color distribution for the entire viewing area or the main viewing area may be performed by using various methods in various orders. For example, the color selector 161 may analyze color distribution of the entire viewing area only when at least one of the main target and the sub-target is not determined by the analysis of color distribution of the main viewing area. These methods and orders may be implemented using programs or algorithms and stored in the graphic memory 165.

The color converter 163 may set the degree of color conversion for the at least one of the main target and the sub-target and convert colors of the at least one of the main target and the sub-target in the image based on the set degree of color conversion.

In this case, the degree of color conversion may refer to intensity of color conversion or distance between the color of the target and the preferred color in the color space. Alternatively, when both the sub-target and the main target are determined, the degrees of color conversion may refer to relative color conversion rates between the sub-target and the main target or relative distances between the colors corresponding thereto and the preferred colors.

For example, when the sub-target is not determined, the color converter 163 may only perform color conversion for the main target. As another example, when both the main target and the sub-target are determined and preferred colors respectively corresponding thereto are selected, the color converter 163 may respectively convert colors of both the main target and the sub-target to be the same as the selected preferred colors.

In this case, the main target should be emphasized more than the sub-target to improve the immersive feeling. Thus, the color converter 163 may more intensely convert the color of the main target than the color of the sub-target. For example, the color converter 163 may perform color conversion such that a distance between the color of the main target and the main color is less than a distance between the color of the sub-target and the sub-color in the color space.

That is, as the color converter 163 performs color conversion such that the main color is more similar to the preferred color, the main target is emphasized more than the sub-target in the image. If all objects are emphasized, image quality may deteriorate and the immersive feeling may decrease. Thus, the color converter 163 may not perform color conversion for the uninterested target and may perform color conversion for the main target and sub-target with different degrees of color conversion.

As the color converter 163 according to an exemplary embodiment performs color conversion only for main objects at which the user mainly gazes, color difference between the main objects and non-main objects increases. Also, by using color difference between the main objects, the immersive feeling may further be improved in the image.

According to an exemplary embodiment, referring to FIG. 3C, the first region R1 is a color region of sea color, and the second region R2 is a color region of the grass color. In this case, the main target may be determined as sea or sea color, and the sub-target may be determined as grass or grass color.

Thus, the color selector 161 may select the preferred color C1 for the first region R1 as the preferred color for the main target, i.e., the main color, and select the preferred color C2 for the second region R2 as the preferred color for the sub-target, i.e., the sub-color. Then, the color converter 163 may convert the colors included in the first region R1 to be concentrated in the preferred color C1 and the colors included in the second region R2 to be concentrated in the preferred color C2 in the color space. In this case, the color converter 163 may increase the color difference by more intensely converting the colors related to the main target.

For example, the color converter 163 may perform color conversion such that the distance between the colors included in the first region R1 and the preferred color C1 after color conversion is less than the distance between the colors included in the second region R2 and the preferred color C2 after color conversion in the image.

Here, this indicates that the color conversion is performed such that a straight line between the color of the main target and the preferred color C1 after color conversion is less than a straight line between the color of the sub-target and the preferred color C2 after color conversion in the color space. In other words, the color converter 163 may convert colors of all pixels representing the main target to be more similar to the preferred color C1.

For example, the color converter 163 may perform color conversion to emphasize the main target more by setting relative conversion rates therefor. Here, the conversion rates may be preset and stored in the graphic memory 165. In this regard, the conversion rates of the main target and the sub-target may be fixed, may be differently set between the object of the main target and the object of the sub-target, or may be differently set in accordance with analysis results of color distribution, without being limited thereto. For example, a conversion rate when the main target is the human skin and the sub-target is sea may be different from that when the main target is the human skin and the sub-target is grass.

According to another exemplary embodiment, the conversion rates may be set proportionally to an area of the main target in the main viewing area. For example, as the area of the main target increases, color conversion for the main target may be performed more intensely that that for the sub-target.

Meanwhile, colors not included in the first region R1 of the image are not converted. If all colors are converted, image quality may deteriorate and the immersive feeling may decrease. Thus, the color converter 163 according to an exemplary embodiment may convert only the colors of the main target or convert the colors of the main target and the sub-target with different conversion rates.

The graphic memory 165 may store image processing programs, data, and the like. In addition, the graphic memory 165 may store image data before color conversion. Accordingly, the color selector 161 and the color converter 163 may perform color conversion by using image data before color conversion stored in the graphic memory 165.

In addition, the graphic memory 165 may store image data after color conversion, and the controller 170 may receive the data from the graphic memory 165 and display the data on the display panel 20. Meanwhile, the graphic memory 165 may be implemented using various known memories without limitation.

The color regions and preferred colors may be preset on the object basis. The graphic memory 165 may store data about the color space, color regions of the color space, and preferred colors. Thus, the color selector 161 may select a preferred color for color conversion by using the data stored in the graphic memory 165.

Meanwhile, although data about the color space, color regions of the color space, and preferred colors is prestored during designing, they may also be updated continuously via the communicator 150, or the like, without being limited thereto.

Meanwhile, as described above, the color selector 161 and the color converter 163 may be implemented using a graphic processor. In this case, the graphic processor and the graphic memory 165 may be implemented using single chips, respectively. However, the graphic processor and the graphic memory 165 are not limited thereto and may also be integrated in a single chip. In other words, the color selector 161, the color converter 163, and the graphic memory 165 may be implemented using single chips, respectively, or integrated into a single chip, without being limited thereto.

Meanwhile, the display apparatus 1 may include the controller 170. The controller 170 includes a processor 171 and a memory 173 as illustrated in FIG. 2.

The memory 173 may store control programs and control data to control operation of the display apparatus 1 and temporarily store control commands received via the input unit 110 or control signals output from the processor 171.

The processor 171 may control the overall operation of the display apparatus 1. The processor 171 may control operation of each of the elements by generating control signals to control the elements of the display apparatus 1.

For example, the processor 171 may transmit or receive a signal including data to or from an external device via the control signal by controlling the communicator 150. According to another exemplary embodiment, the processor 171 may control the volume of sounds output via the speaker 131 by transmitting a control signal to the sound output unit 130 in accordance with a command to control the volume received from the input unit 110.

As another example, the processor 171 may control the image processor 160 to perform image processing on contents received from the content receiver 120 and control the display 140 to display the processed image.

According to an exemplary embodiment, the processor 171 may perform color conversion on an image of contents received from the content receiver 120 by controlling the image processor 160 via the control signal. Also, the processor 171 may control the display 140 to display a color-converted image via a control signal.

In addition, the processor 171 may process various data stored in the memory 173 in accordance with control programs stored in the memory 173. Although the processor 171 is separated from the memory 173 above, the processor 171 and the memory 173 are not limited to the separate chips described above. The processor 171 and the memory 113 may also be integrated into a single chip. Hereinafter, operation of the display apparatus 1 converting colors will be described.

Figure 6:
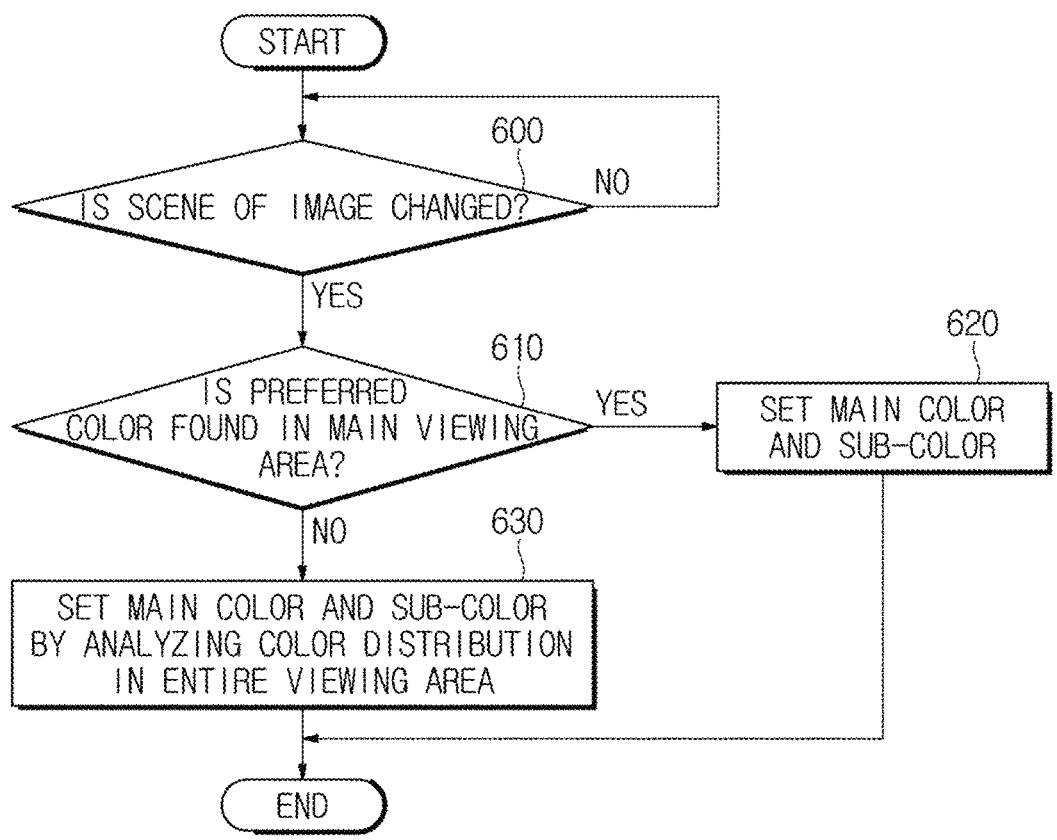
FIG. 6 is a flowchart illustrating operation of a display apparatus performing color conversion with different rates by setting a main color and a sub-color according to an exemplary embodiment.
Figure 7A:
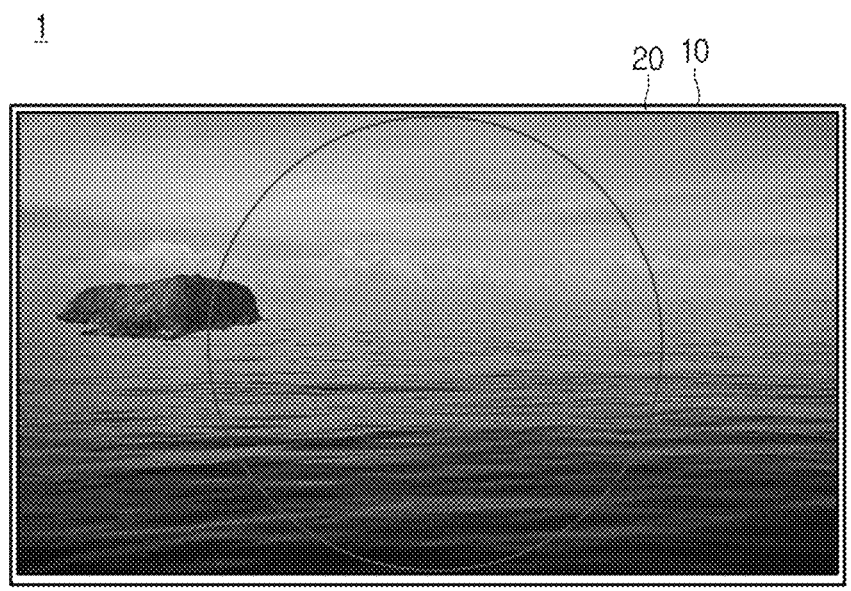
FIG. 7A, FIG. 7B, and FIG. 7C are views illustrating differences among images caused by color conversion according to an exemplary embodiment.
Figure 7B:
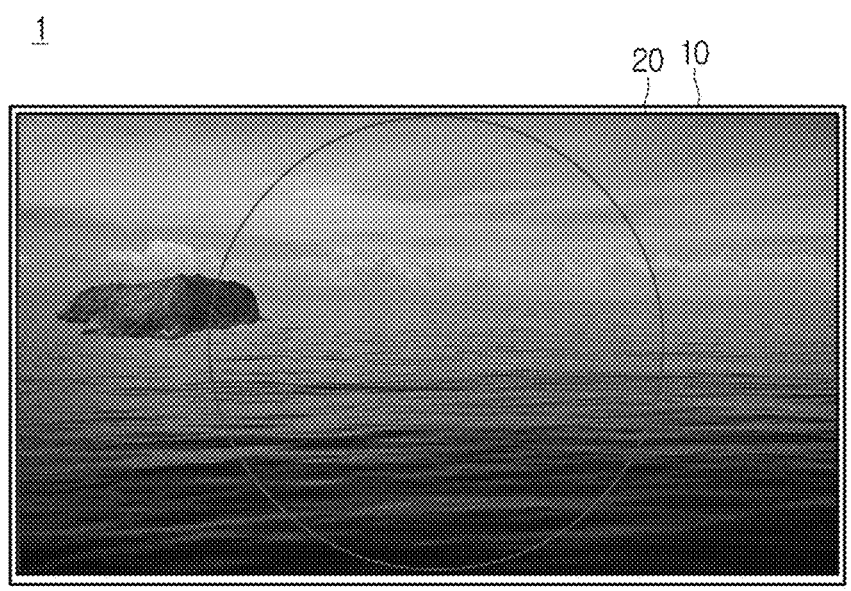
Figure 7C:
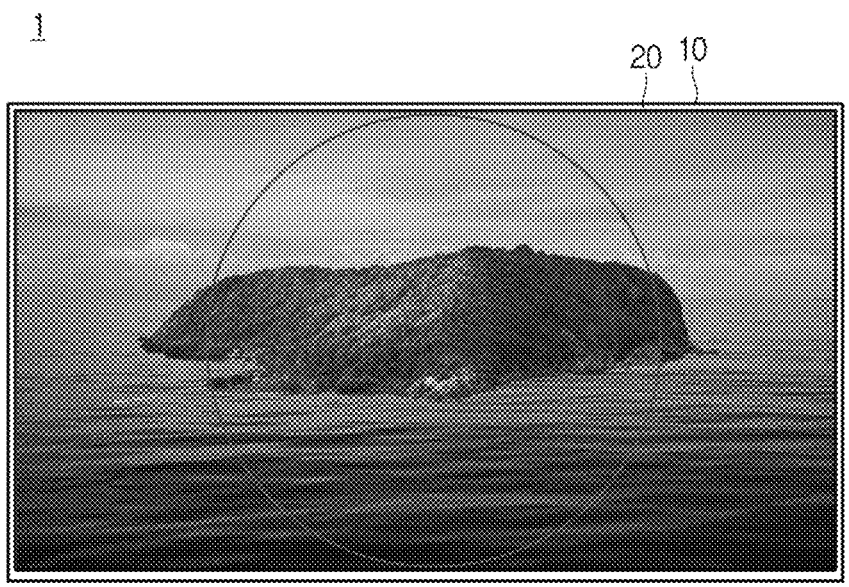

FIG. 6 is a flowchart for describing operation of a display apparatus according to an exemplary embodiment performing color conversion with different rates by setting a main color and a sub-color. FIGS. 7A to 7C are views for describing differences among images caused by color conversion according to an exemplary embodiment.

The display apparatus may perform color conversion in an image by determining at least one of the main target and the sub-target, and display a color-converted image on the display panel. In this case, the display apparatus may repeat determination of the main target and the sub-target in accordance with a change in scenes of the image.

An image includes at least one scene. Here, color conversion performed while a scene is maintained may interrupt the user watching the image due to a sudden change in colors of the image. In addition, if the target for color conversion is changed even when the scene is not changed, user's immersion in watching the image may decrease.

Thus, while color conversion is not performed, the display apparatus does not perform color conversion operation before the scene is changed. Alternatively, while color conversion is performed, the display apparatus does not change the target for color conversion.

Thus, the display apparatus may determine whether the scene of the image provided via the display panel is changed (600). When the scene of the image is not changed, the display apparatus maintains previous colors.

When the scene of the image is changed, the display apparatus may determine whether a preferred color is found in the main viewing area (610). For example, the display apparatus may determine whether the main target and the sub-target, which are targets for color conversion, exist by analyzing color distribution of the main viewing area.

Here, the display apparatus may analyze colors of the main viewing area and colors densely distributed therein. Thus, the display apparatus may determine a color or an object represented by the color at which the user mainly gazes as the main target and a color or an object represented by the color at which the user gazes next as the sub-target.

In addition, the display apparatus may determine whether the preferred color for the main target is found in the color space. As described above, color regions and preferred colors are not set in the color space for all of the objects.

Not every object catches eyes of the user. Color regions and preferred colors only for particular objects are set in the color space. In other words, when there is no preferred color corresponding to the main target or the sub-target, the display apparatus determines that the main target or the sub-target does not affect the immersive feeling of the user and does not perform color conversion therefor despite a high distribution density.

Meanwhile, when the main target and the sub-target are determined and preferred colors corresponding thereto are found in the color space, the display apparatus may set a preferred color of the main target as a main color and a preferred color of the sub-target as a sub-color (620).

Then, the display apparatus may perform color conversion with different conversion rates between the main color and the sub-color and may provide an immersive image to the user by displaying the color-converted image on the display. In this case, any method used to improve immersive feelings by applying different conversion rates to the main color and the sub-color may also be used for color conversion, without limitation.

For example, the display apparatus may determine at least one of the main target and the sub-target in the main viewing area as illustrated in FIG. 7A. In this case, the display apparatus may set a sea or sea color having the highest density and distribution degree as the main target by analyzing color distribution of the main viewing area. Then, the display apparatus may set a preferred color for the sea color as the main color.

The display apparatus may convert the sea color of the current image into the main color or convert the sea color into a color similar to the preferred color. According to an exemplary embodiment, FIG. 7B illustrates a screen of a display panel displaying an image, in which color conversion is performed on the sea color. Referring to FIG. 7B, the sea color as the main target is converted into a more vivid color in the image displayed on the display panel.

As another example, the display apparatus may determine the sea as the main target and leaves of trees found in an island as the sub-target. Accordingly, the display apparatus may set the preferred color of the user for the sea as the main color and the preferred color of the user for the leaves as the sub-color.

The display apparatus may perform color conversion with different conversion rates such that a distance between the color of the sea and the main color becomes shorter than a distance between the color of the leaves and the sub-color in the color space.

As another example, FIG. 7C illustrates a screen of the display panel displaying an image in which the color of the leaves is converted. Referring to FIG. 7C, a color distributed with the largest amount and highest density in the main viewing area is the color of the leaves. Thus, the display apparatus determines the color of the leaves as the main target in FIG. 7C. It may be confirmed that the color of the leaves is converted into a more vivid color than that illustrated in FIG. 7A.

However, when the main target and the sub-target are not determined in the main viewing area or the main color and the sub-color corresponding to the main target and the sub-target are not found in the color space, the display apparatus may analyze color distribution of the entire viewing area to set the main color and the sub-color (630).

For example, if there is no color region occupying the main viewing area by 50% or more, the display apparatus may determine the main color and the sub-color by analyzing color distribution of the entire viewing area. A method of analyzing color distribution of the entire viewing area may be the same or different from that of analyzing color distribution of the main viewing area and is not limited.

For example, when the preferred color for the main target is determined as the main color, and the preferred color for the sub-target is determined as the sub-color by analyzing color distribution of the entire viewing area, the display apparatus may determine different conversion rates for the main target and the sub-target.

According to an exemplary embodiment, the display apparatus may perform color conversion such that a distance between the color of the main target and the main color after color conversion is shorter than a distance between the color of the sub-target and the sub-color after the color conversion. Thus, the display apparatus may prevent image quality deterioration caused by color conversion performed on all regions and provide an image with high immersive feeling by displaying an image in which the main target is emphasized on the display panel.

FIG. 8 is a flowchart for describing operation of a display apparatus according to an exemplary embodiment displaying an image in which color conversion is performed on at least one of the main target and the sub-target on a display panel.

The display apparatus may analyze color distribution of an image and select a preferred color corresponding to at least one of a main target and a sub-target determined based on analysis results (800). Here, the preferred color is a color preferred to represent an object by the user and may be set in a color space differently according to the object. Since data regarding the preferred color is stored in a memory of the display apparatus or in a separate device connected via a communication network such as an external server, the display apparatus may select the preferred color by using the data.

Meanwhile, the display apparatus may determine at least one of the main target and the sub-target by analyzing color distribution of the entire viewing area or analyzing color distribution of a predetermined area.

Here, the predetermined area may be a part of the entire viewing area. For example, a central area of the image at which the user mainly gazes may be set as the predetermined area, without being limited thereto. According to an exemplary embodiment, the predetermined area may correspond to the main viewing area as described above. Data regarding an area subject to color distribution may be stored in the memory of the display apparatus or the external server, and thus the display apparatus may determine the area subject to color distribution by using the data.

In this case, the display apparatus may determine at least one of the main target and the sub-target per every scene. That is, the display apparatus may not change the main target or the sub-target while one scene is maintained to prevent the user from being confused.

The display apparatus may set degrees of color conversion for at least one of the main target and the sub-target and perform color conversion based on the set degrees of color conversion (810). In this case, the degree of color conversion may refer to intensity of color conversion or conversion rate of color. In this case, the degree of color conversion may be preset or relatively set for each of the main target and the sub-target.

For example, the display apparatus may cause color difference by setting a color enhance gain for the main target as twice and a color enhance gain for the sub-target as 1.1 times.

Meanwhile, the degree of color conversion of the display apparatus is not limited to those described above. Any method of performing color conversion to emphasize the main target may also be used without limitation, for example, such that the distance between the color of the main target and the main color is shorter than the distance between the color of the sub-target and the sub-color in the color space.

The display apparatus may display a color-converted image via the display panel (820). The display apparatus according to an exemplary embodiment may realize vivid colors without having image quality deterioration and reproduce an image having high immersive feeling by performing color conversion only on at least one of the main target and the sub-target with different degrees of color conversion or different color conversion rates instead of performing color conversion on all objects included in the image.

Although exemplary embodiments have been provided for illustrative purposes, those skilled in the art will appreciate that various modifications are possible, without departing from the scope and spirit of the invention as disclosed in the accompanying claims.

The terms used in the present specification are merely used to describe exemplary embodiments, and are not intended to limit the present disclosure. An expression used in the singular encompasses the expression of the plural, unless it has a clearly different meaning in the context. In the present specification, it is to be understood that the terms such as "including" or "having," etc., are intended to indicate the existence of the features, numbers, operations, components, parts, or combinations thereof disclosed in the specification, and are not intended to preclude the possibility that one or more other features, numbers, operations, components, parts, or combinations thereof may exist or may be added.

It will be understood that, although the terms "first", "second", etc., may be used herein to describe various elements, these elements should not be limited by these terms. The above terms are used only to distinguish one component from another. For example, a first component discussed below could be termed a second component, and similarly, a second component may be termed a first component without departing from the teachings of this disclosure. As used herein, the term "and/or" includes any and all combinations of one or more of the associated listed items. Expressions such as "at least one of," when preceding a list of elements, modify the entire list of elements and do not modify the individual elements of the list.

In addition, the terms "unit", "device," "block", "member", and "module" used herein refer to a unit which can be embodied as software stored in a memory, hardware such as field-programmable gate array (FPGA) or application specific integrated circuit (ASIC), or a combination thereof, for processing at least one function and performing an operation. However, the terms "unit", "device," "block", "member", and "module" are not limited to software or hardware. The "unit", "device," "block", "member", and "module" may be stored in a storage medium and implemented by one or more processors.

Although exemplary embodiments have been shown and described, it should be appreciated by those skilled in the art that changes may be made in the exemplary embodiments without departing from the principles and spirit of the disclosure, the scope of which is defined in the claims and their equivalents.

What is claimed is:

1. A display apparatus comprising:
    a color selector configured to select a preferred color corresponding to at least one of a main target or a sub-target determined in an image based on color distribution;
    a color converter configured to perform color conversion by setting a degree of color conversion of the at least one of the main target or the sub-target, and converting a color of the at least one of the main target or the sub-target in the image based on the set degree of color conversion; and
    a controller configured to display the image on a display panel,
    wherein the color selector is further configured to determine the at least one of the main target or the sub-target by analyzing color distribution of the image when a scene change occurs.

2. The display apparatus according to claim 1, wherein the color selector is further configured to determine the at least one of the main target or the sub-target by analyzing color distribution of a main viewing area in the image.

3. The display apparatus according to claim 1, wherein the color selector is further configured to determine the at least one of the main target or the sub-target based on at least one of a distribution amount or a distribution degree of colors in a main viewing area of the image.

4. The display apparatus according to claim 1, wherein the color selector is further configured to analyze distribution amounts and distribution degrees of colors in a main viewing area of the image, set priorities to the analyzed distribution amounts and distribution degrees of colors, and determine the main target and the sub-target based on the set priorities.

5. The display apparatus according to claim 1, wherein the color selector is further configured to set a preferred color for the main target as a main color and a preferred color for the sub-target as a sub-color in a color space.

6. The display apparatus according to claim 2, wherein the color selector is further configured to analyze color distribution of an entire viewing area and determine the at least one of the main target or the sub-target in response to determining that there is no main target in the main viewing area.

7. The display apparatus according to claim 1, wherein the color selector is further configured to set a circular area having a diameter equal to a length of the display panel to display the image as a main viewing area.

8. The display apparatus according to claim 1, wherein the color converter is further configured to set different degrees of color conversion for the main target and the sub-target.

9. The display apparatus according to claim 1, wherein the color converter is further configured to perform color conversion based on preset color conversion rates for the main target and the sub-target.

10. The display apparatus according to claim 1, wherein the color converter is further configured to perform color conversion to have a distance between a color of the main target and a preferred color for the main target shorter than a distance between a color of the sub-target and a preferred color for the sub-target in a color space.

11. The display apparatus according to claim 5, wherein the color converter is further configured to perform color conversion to have a distance between a color of the main target and the main color shorter than a distance between a color of the sub-target and the sub-color in the color space.

12. The display apparatus according to claim 1, wherein the color converter is further configured to maintain degrees of color conversion for the main target and the sub-target until a scene is changed in the image.

13. A method of controlling a display apparatus, the method comprising:
    selecting a preferred color, via a color selector of the display apparatus, corresponding to at least one of a main target or a sub-target determined in an image based on color distribution;
    performing color conversion, via a color converter of the display apparatus, by setting a degree of color conversion of the at least one of the main target or the sub-target and converting a color of the at least one of the main target or the sub-target in the image based on the set degree of color conversion; and
    displaying the image on a display panel of the display apparatus,
    wherein the selecting the preferred color comprises determining the at least one of the main target or the sub-target by analyzing color distribution of the image when a scene change occurs.

14. The method according to claim 13, wherein the selecting the preferred color comprises determining the at least one of the main target or the sub-target by analyzing color distribution of a main viewing area in the image.

15. The method according to claim 13, wherein the selecting the preferred color comprises determining the at least one of the main target or the sub-target based on at least one of a distribution amount or a distribution degree of colors in a main viewing area of the image.

16. The method according to claim 13, wherein the selecting the preferred color comprises analyzing distribution amounts and distribution degrees of colors in a main viewing area of the image, setting priorities to the analyzed distribution amounts and distribution degrees of colors, and determining the main target and the sub-target based on the set priorities.

17. The method according to claim 13, wherein the selecting the preferred color comprises determining the at least one of the main target or the sub-target by analyzing color distribution of the image whenever a scene is changed in the image.

18. The method according to claim 13, wherein the performing the color conversion comprises setting different degrees of color conversion for the main target and the sub-target.

* * * * *